United States Patent Office 2,924,883
Patented Feb. 16, 1960

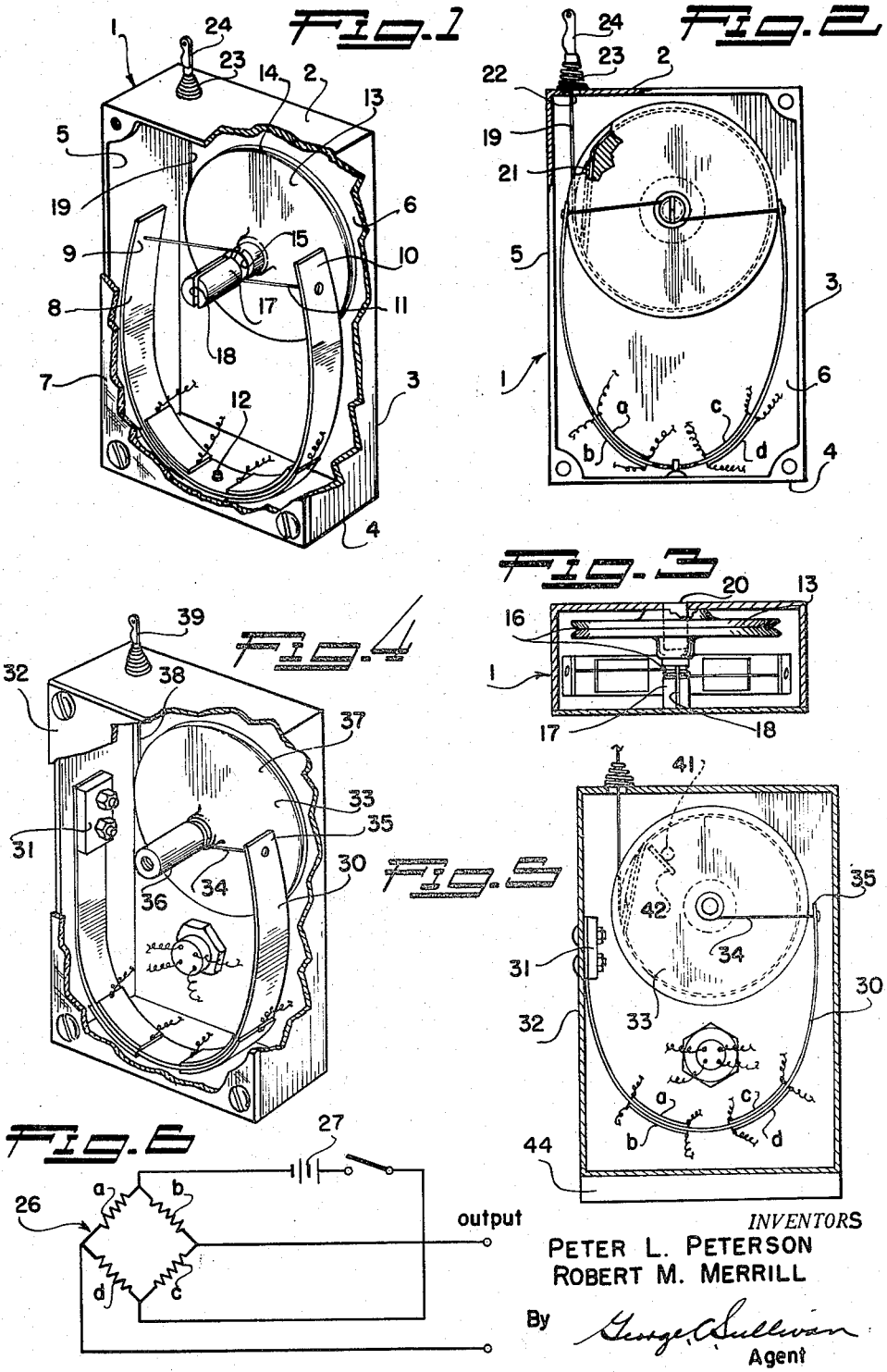

2,924,883

DEFLECTION MEASURING DEVICE

Peter L. Petersen, Burbank, and Robert M. Merrill, Pacoima, Calif., assignors to Lockheed Aircraft Corporation, Burbank, Calif.

Application September 11, 1956, Serial No. 609,307

7 Claims. (Cl. 33—125)

This invention relates to measuring devices and more particularly to an electrical deflection gage for converting a mechanical deflection into an analogue electrical signal which can be measured on electrical indicating or recording equipment.

One of the most critical problems confronting designers of structural elements subject to repeated or recurring loads is the measurement of mechanical deflections and displacement of the structural elements under test conditions. This problem is particularly acute in the design of aircraft parts since without the knowledge of test measurements the structural elements may be subjected to vibrations and stresses built up to sufficient magnitude in flight to cause failure of the element itself with the ensuing probability of destruction of the aircraft. To alleviate this danger, it has been the practice to subject various aircraft structural elements to wide ranges of loading and simultaneously therewith measure the ensuing structural displacement or deflection appearing at different points along the structure. For example, a wing may be subjected to a mechanical vibration slowly varying in intensity while the wing displacement is concurrently being recorded.

Where minute deflections are to be measured, it is common practice to employ strain gages directly onto the test structure. However, for deflections greater than a few thousandths of an inch, this is not practical and accordingly, in the measurement of larger deflections, a scale and transit arrangement is conventionally employed for optically sighting the distance between scale readings to obtain the test data. It is the measurement of the larger deflections normally requiring the use of optical sighting arrangements with which this invention is primarily concerned.

Test data such as deflection measurements which involve large quantities of similar information are preferably handled by automatic data reduction computer systems. The optical output from a scale and transit arrangement is obviously not well suited to automatic data reduction techniques. Much manpower is required to manually transcribe and report measurements and to effect the necessary conversion of recorded information into suitable form for automatic data reduction. Also the scale and transit are rather large and cumbersome, creating space limitations which do not permit efficient or extensive use of optical measuring techniques.

The present invention provides a device which extends the practical use of strain gages for measuring mechanical deflections of only a few thousandths of an inch to the measurement of deflections of any magnitude within practical limits from 0 to 50 or more inches. The output of the device is an electrical voltage proportional to structural deflection. Therefore, it is possible to record deflections remotely and rapidly in a form suitable for automatic data reduction. A major saving in manpower and data reduction time is achieved and a mark increased in reliability obtained.

An object of this invention is to provide an electrical deflection measuring device for converting a mechanical deflection into an analogue electrical signal which can be applied to remotely located electrical indicating or recording equipment.

Another object of this invention is to provide an electrical deflection measuring device employing strain gages on a flexible beam which is pre-stressed and shaped to provide high sensitivity over a wide deflection range. The device is capable of measuring linear deflections accurately to ten thousandths of an inch over the full deflection range desired.

Another object of this invention is to provide an electrical deflection measuring device which may be packaged as a small, compact, low-cost and readily serviceable unit compatible with all data processing systems in use today. The device when designed for an operating range of 0 to 5 inches, for example, may easily be packaged in a space no larger than approximately 3 inches by 2 inches by 1 inch.

Still another object of this invention is to provide an electrical deflection measuring device which will maintain its sensitivity practically indefinitely to provide accurate and reliable measurements through repeated uses of the equipment. These are no gears or mechanical linkages to wear and deteriorate performance.

Further and other objects will become apparent from a reading of the following description especially when considered in combination with the accompanying drawing wherein like numerals refer to like parts.

In the drawing:

Figure 1 is a fragmentary perspective view of one embodiment of the electrical deflection measuring device;

Figure 2 is a sectional front view of the device shown in Figure 1;

Figure 3 is a sectional end view of the device shown in Figure 1;

Figure 4 is a fragmentary perspective view of a second embodiment of the electrical deflection measuring device;

Figure 5 is a sectional front view of the device shown in Figure 4; and

Figure 6 is a schematic diagram showing the circuit arrangement for the strain gages employed in the devices of Figures 1 and 4.

The electrical deflection measuring device as shown in Figures 1 through 3 includes a box-like housing 1 generally rectangular in shape having sides 2, 3, 4 and 5 with a rear panel 6 and a front panel 7. Front panel 7 may be made of a transparent plastic material such as Lucite to permit an observer to view the deflection measuring mechanism. A thin flexible beam 8 of spring steel or the like carried inside the housing is pre-stressed by bending the same into a substantially U shape. The ends 9 and 10 of beam 8 are connected by an inelastic cable 11 of wire or the like confining the beam to its pre-stressed generally U shape configuration. An opening is formed at the crest of U shaped beam 8 for receiving a pin 12 projecting inwardly from side 4 of housing 1. Pin 12, in co-operation with pulley 13 hereinafter described, positions the beam within housing 1 without exerting a mechanical restraint on bending of the beam. The symmetrical bending thus obtained is important in providing a linear output from the measuring device.

Pulley 13 is provided with a large diametral portion 14 and a small diametral portion 15 having grooves 16 formed therein for receiving cables 19 and 11, respectively. A shaft 17 projects axially through the pulley to engage a pin 20 on rear panel 6 and rest against front panel 7 for supporting the pulley and allowing only rotational movement thereof relative to the housing. As shown in the drawing, pulley 13 is located between the two ends 9 and 10 of beam 8. Shaft 17 is provided with axial slot 18 for sliding cable 11 therethrough and seating the same into groove 16 in the small diametral portion of the pulley.

Control cable 19 is wound on groove 16 in the outer diametral portion 14 of pulley 13 and anchored at one end to the pulley by suitable means such as a dowl pin 21. The opposite end of cable 19 is fed through an opening 22 formed in side 2 of housing 1 for attaching the free end of the cable to a part (not shown), the deflection of which to be measured. To facilitate connecting the cable to the part, a connector 24 may be secured to the free end of the cable.

As noted in the drawing, cables 11 and 19 engage the pulley so as to be wound thereon in the opposite screw sense, that is, as cable 19 is unwound, cable 11 is being wound, causing ends 9 and 10 of beam 8 to be pulled closer together and towards shaft 17 on the pulley.

The force exerted by the pre-stressed beam 8 automatically urges cable 11 to unwind and cable 19 to wind up, thus maintaining a slight tension-load on cable 19 to avoid backlash in the measuring device and to keep the cable wound on pulley 13 inside the housing when not in use.

A spring 23 may be provided on the outside of housing 1 concentric with opening 22 and cable 19 for engaging connector 24 and relieving the force of shock loads due to quick release of the cable.

Four strain gages (a), (b), (c) and (d) are secured on the outer surfaces of beam 8 near the crest 20 thereof. Strain gages (a) and (b) are located back to back on opposite sides of the beam to the left of opening 11 as viewed in Figure 2 and strain gages (c) and (d) are located back to back on opposite sides of the beam to the right of opening 11 as viewed in Figure 2 to present a symmetrical arrangement. By locating the strain gages adjacent the crest of the beam where the deflections due to rotation of pulley 13 are nearly maximum, exceptionally good sensitivity is obtained. Strain gages (a), (b), (c) and (d) are connected in a conventional bridge circuit 26 as illustrated in Figure 6 wherein a direct current electrical potential is applied to the bridge through a battery 27 or the like and the change in resistance of the strain gages due to the bending of beam 8 provides an output voltage which is proportional to the rotational position of pulley 13 from an established zero reference position.

A modification of the configuration shown in Figures 1 through 3 is illustrated in Figures 4 and 5 wherein flexible beam 30 is secured at one end 31 to housing 32 to extend in a direction away from pulley 33 whereby the beam when bent into a generally U shape is pre-stressed to exert a force through cable 34 automatically urging the pulley into an extreme rotational position. Cable 34 is secured to the free end 35 of beam 30 and to the small diametral portion 36 of pulley 33. The large diametral portion 37 of pulley 33 accommodates a second cable 38 corresponding in function to cable 19 in the Figure 1 configuration. Cables 38 and 34 are wound around the pulley in the opposite screw sense so that as cable 38 is unwound, cable 34 is wound, causing the free end 35 of beam 30 to move inwardly producing a deflection which is detected by strain gages (a), (b), (c) and (d) to provide an output proportional to the rotational position of the pulley. The strain gages in the configuration of Figures 4 and 5 are symmetrically arranged generally as described above for the configuration of Figures 1 through 3.

The free end of cable 38 which projects outside housing 32 may be provided with a connector 39 for conveniently attaching the cable to the part or structure (not shown), the deflection of which is to be measured. A damping spring like 23 in the Figure 1 configuration may be carried by housing 32 concentric with cable 38 for relieving the force of shock loads due to quick release of the cable.

Where the rotation of the pulley is not to exceed one complete revolution over the full deflection range, it may be desirable to provide a detent 41 on pulley 33 which is arranged to engage an inwardly projecting flange 42 on the rear panel when the pulley is rotated to the cable stowing position. By this means, a definite limit for pulley rotation is established without relying upon the tension in cable 34 to perform the function.

The modified configuration of Figures 4 and 5 does not have the sensitivity that the configuration of Figures 1 through 3 possesses, nor is the flexible beam as free from mechanical restraint, however it will exhibit performance which is entirely acceptable for the majority of applications.

A typical test set up using the electrical deflection measuring device described herein requires mounting the unit by its housing 1 or 32 to fixed structure by suitable means such as magnetic base plate 44 or by conventional screws, bolts or the like. The connector 24 or 39 on the free end of cable 19 or 38 is attached to the test part which is located at a distance from the measuring device housing such that the total deflections in the test part will not exceed the upper and lower limits of the deflection range of the measuring instrument as defined by the maximum limits of rotation of the pulley. Strain gages (a), (b), (c) and (d) secured to flexible beam 8 or 30 are arranged in a bridge circuit as illustrated in Figure 6 and the output is connected to suitable recording apparatus (not shown). Loads are then applied to the part under test causing the same to deflect. As the part deflects, cable 19 or 38 effects rotation of the pulley in the measuring device to produce deflections in the flexible beam which are proportional to the deflection of the part under test. These deflections in the flexible beam are detected by the strain gage circuit to provide a voltage output accurately indicating the magnitude of the deflections in the part.

The sensitivity of the measuring device is effected by the ratio between the two different diametral portions of pulleys 13 and 33, however, this is only incidental to the real purpose of the particular pulley configuration. The small diametral portions of the pulleys permit considerable movement of the flexible beams within a relatively small space while the large diametral portion provides a substantial deflection range for the measuring device.

Both configurations, but particularly the configuration of Figures 1 through 3, permit the beam elements to be readily interchanged, providing a wide range of strain gage bridge resistances and beam loading arrangements to be used. As a result, the device is capable of meeting a wide variety of test setup requirements.

While only two embodiments are shown and described herein, it should be understood that many alterations, modifications and substitutions may be made to the instant disclosure without departing from the spirit and scope of the invention as defined by the appended claims.

We claim:

1. A deflection measuring device for indicating the magnitude of the deflections in a part comprising, a housing, a pulley rotatably carried within said housing, said pulley having at least two different diametral portions, a cable wound around one diametral portion of said pulley and arranged to engage the part and effect rotation of the pulley in only one direction in response to relative movement between the part and the measuring device, a flexible beam secured at one end to said housing and extending in a direction away from said pulley, a second cable wound around a different diametral portion of said pulley in a direction opposite to that of the first mentioned cable, said second cable connecting with the free end of said beam and holding the latter in a generally U shape urging said pulley to rotate in the opposite direction from that effected by said part, means carried by said housing and limiting the rotation of said pulley, and strain gage means secured to said beam and providing an electrical output proportional to the rotational position of said pulley.

2. A deflection measuring device for indicating the magnitude of the deflections in a part comprising, a housing, a pulley rotatably carried within said housing, said pulley having at least two different diametral portions, a cable wound around one diametral portion of said pulley and arranged to engage the part and effect rotation of the pulley in only one direction in response to relative movement between the part and the measuring device, a second cable connecting with a different diametral portion of said pulley for effecting rotation in a direction opposite to that of the first mentioned cable, a flexible beam carried within said housing, at least one of the ends of said beam connecting with said second cable whereby the beam is preloaded and forced into a generally U shape and pulled towards said pulley in response to rotation thereof by the first mentioned cable providing a restoring force urging the pulley to return to a predetermined reference position, and strain gage means secured to said beam and providing an electrical output proportional to the amount of rotation of said pulley from said predetermined reference position.

3. A deflection measuring device for indicating the magnitude of the deflections in a structural member comprising, a housing, a pulley rotatably carried by said housing, a flexible beam secured at one end to said housing, a cable wound on said pulley and engaging the free end of said flexible beam to preload and confine the same to a substantially U shape and produce beam deflections in response to pulley rotation, said beam providing the restoring force urging the pulley to always return to a predetermined reference position, a plurality of symmetrically arranged strain gages secured to said beam near the crest thereof and connected in a bridge network to provide an electrical output representing changes in beam deflection, and a second cable wound on said pulley and arranged to connect with the structural member for rotating the pulley in response to movement of the structural member.

4. A deflection measuring device for indicating the magnitude of the deflections in a part comprising, a housing, a pulley rotatably carried within said housing, said pulley having at least two different diametral portions, a cable wound around one diametral portion of said pulley and arranged to engage the part and effect rotation of the pulley in only one direction in response to relative movement between the part and the measuring device, a preloaded flexible beam secured at one end to said housing and extending in a direction away from said pulley, a second cable connecting with a different diametral portion of said pulley and with the free end of said beam whereby the latter is deflected in response to rotation of the pulley by the first mentioned cable, said preloaded beam exerting a pull on said second cable urging said pulley to rotate in the opposite direction from that effected by said part, and strain gage means secured to said beam and providing an electrical output proportional to the rotational position of said pulley.

5. A deflection measuring device for accurately indicating the magnitude of the deflections in a part comprising, a housing, a flexible beam carried within said housing, a pulley rotatably carried by said housing, a cable connecting with the ends of said beam and engaging said pulley to be wound thereon and deflect the beam by an amount proportional to pulley rotation, said cable confining said beam to a substantially symmetrical shape exerting a force on said pulley urging the same to a predetermined rotational position, a second cable secured to said pulley for engaging the part and rotating said pulley against the action of said beam, an amount substantially proportional to the magnitude of the deflection of the part, and strain gage means secured to said flexible beam and providing an electrical output indicating beam deflection.

6. An electrical deflection measuring device for indicating the magnitude of the deflections in a part comprising, a housing, a flexible beam carried within said housing, a pulley rotatably carried by said housing, said pulley having two different diametral portions, a cable engaging one diametral portion of said pulley for being wound thereon in response to pulley rotation, said cable connecting with at least one end of said flexible beam and confining the latter to a substantially symmetrically curved configuration in opposition to the resistance offered by the flexible beam, whereby the pulley is urged to assume a predetermined rotational position, a second cable wound around the other diametral portion of said pulley for rotating the same from said predetermined rotational position, and strain gage means secured to said flexible beam and providing an electrical output indicating beam deflection.

7. A deflection measuring device for accurately indicating the magnitude of the deflections in a part comprising, a housing, a flexible beam carried within said housing, a pulley rotatably carried by said housing, said pulley having at least two different diametral portions, said pulley having a slot formed transversely therethrough at one of said diametral portions, a cable connecting with the ends of said beam and threaded through said slot whereby the cable is wound on said pulley in response to pulley rotation causing said beam to deflect proportionately, said cable holding said beam in a substantially symmetrical configuration exerting a force on said pulley urging the same to a predetermined rotational position, a second cable wound on the other diametral portion of said pulley and extending outside said housing for engaging the part and rotating said pulley against the action of said beam an amount substantially proportional to the magnitude of the deflection of the part, and strain gage means secured to said beam and providing an electrical output representing beam deflection.

References Cited in the file of this patent

UNITED STATES PATENTS

| | | |
|---|---|---|
| 399,676 | Leuner | Mar. 19, 1889 |
| 2,453,354 | De Forest | Jan. 4, 1949 |
| 2,468,906 | Whitehead | May 3, 1949 |
| 2,487,681 | Weisselberg | Nov. 8, 1949 |
| 2,546,155 | Haber et al. | Mar. 27, 1951 |
| 2,681,566 | Ruge | June 22, 1954 |